UNITED STATES PATENT OFFICE.

JAMES P. McLEAN, OF NEW YORK, N. Y.

IMPROVEMENT IN PROCESSES OF PRESERVING ANIMAL AND VEGETABLE SUBSTANCES.

Specification forming part of Letters Patent No. 187,030, dated February 6, 1877; application filed January 29, 1877.

*To all whom it may concern:*

Be it known that I, JAMES P. MCLEAN, of the city, county, and State of New York, have invented certain novel and useful Improvements in Processes for Preserving and Packing in Bulk Animal and Vegetable Substances; and I do hereby declare in what manner the same is to be performed, to wit:

Take an ordinary packing box or barrel and burn it upon the internal surface thereof until it becomes perfectly charred over the entire inner surface one-eighth of an inch thick, more or less; then I prepare a plastic coating composed of ground gypsum and pulverized wood-charcoal mixed with silicate of soda or liquid glass and water, to the consistency of paste, or thin mortar; then apply the same over the entire charred surface of the case or barrel by means of a brush, or otherwise, and let stand until the coating becomes hard. I next wrap the hams, fish, or fruit in either paper, cloth, or tin-foil, and for eggs, butter, strawberries, or any fragile or soft substances, I would coat the same with silicated mortar, as above, which forms a rigid protecting shell against the injurious effects from handling, as well as from the damp sea-air or moisture of any kind, without any injurious chemical effects to either animal or vegetable substances, which is packed in the above cases or barrels in layers of dry powdered charcoal and gypsum mixed together, until the case is full; then a paper is prepared upon one side thereof with a plastic coating (similar to that used upon the inner surface of the barrel or case) and placed over the whole under the cover of the case, to prevent the action of the outside gases upon the charcoal.

What I claim as a new and useful process is—

The process of preserving animal and vegetable substances in bulk, which consists in packing them in a dry powder consisting of gypsum and carbon, and then enveloping the whole with plastic shell, composed of gypsum, carbon, silicate of soda, and water, or vice versa, substantially as described.

In testimony whereof I hereunto subscribe my name in the presence of two witnesses.

JAMES P. McLEAN.

Witnesses:
WM. H. BATES,
BENJ. C. POLE.